United States Patent
Kadle et al.

(10) Patent No.: US 9,494,350 B2
(45) Date of Patent: Nov. 15, 2016

(54) PLATE-TYPE HEAT PUMP AIR CONDITIONER HEAT EXCHANGER FOR A UNITARY HEAT PUMP AIR CONDITIONER

(71) Applicant: MAHLE International GmbH, Stuttgart (DE)

(72) Inventors: Prasad S. Kadle, Williamsville, NY (US); Gary S. Vreeland, Medina, NY (US); Frederick V. Oddi, Orchard Park, NY (US)

(73) Assignee: MAHLE International GmbH, Stuttgart (DE)

( * ) Notice: Subject to any disclaimer, the term of this patent is extended or adjusted under 35 U.S.C. 154(b) by 139 days.

(21) Appl. No.: 14/297,121

(22) Filed: Jun. 5, 2014

(65) Prior Publication Data
US 2014/0284034 A1 Sep. 25, 2014
US 2016/0298912 A9 Oct. 13, 2016

Related U.S. Application Data

(63) Continuation of application No. 13/396,211, filed on Feb. 14, 2012, now Pat. No. 8,899,062.

(60) Provisional application No. 61/443,774, filed on Feb. 17, 2011.

(51) Int. Cl.
| F25D 17/00 | (2006.01) |
| F25B 30/02 | (2006.01) |
| F25B 1/00 | (2006.01) |
| F28D 9/00 | (2006.01) |
| B60H 1/00 | (2006.01) |
| F28F 3/08 | (2006.01) |
| F25B 29/00 | (2006.01) |

(52) U.S. Cl.
CPC ........... *F25B 30/02* (2013.01); *B60H 1/00342* (2013.01); *B60H 1/00899* (2013.01); *F25B 1/00* (2013.01); *F25B 29/003* (2013.01); *F28D 9/005* (2013.01); *F28D 9/0093* (2013.01); *F28F 3/08* (2013.01); *B60H 2001/00928* (2013.01)

(58) Field of Classification Search
CPC ................. F28D 9/005; F28D 9/0093; B60H 2001/00928; B60H 1/00342; B60H 1/00899; F25B 29/003; F25B 30/02; F25B 1/00; F28F 3/08
USPC ................... 165/166, 174; 62/515
See application file for complete search history.

(56) References Cited

U.S. PATENT DOCUMENTS

| 4,829,777 A | 5/1989 | Matsuoka et al. |
| 5,265,437 A | 11/1993 | Saperstein et al. |

(Continued)

FOREIGN PATENT DOCUMENTS

EP 2 174 810 A2 4/2010

*Primary Examiner* — Len Tran
*Assistant Examiner* — Ana Vazquez
(74) *Attorney, Agent, or Firm* — Brinks Gilson & Lione

(57) ABSTRACT

A plate-type heat exchanger having a first heat exchanger portion configured to receive a refrigerant flow and a hot side coolant flow having a lower temperature than the refrigerant flow, a second heat exchanger portion configured to receive the refrigerant flow exiting from the first heat exchanger portion and a cold side coolant flow having a higher temperature than the refrigerant flow exiting from the first heat exchanger portion, and an internal heat exchanger portion sandwiched between the first heat exchanger portion and the second heat exchanger portion. The refrigerant flow through the plate type heat exchanger is in non-contact thermal communication with the hot side coolant flow and the cold side coolant flow. The cold side coolant flow transfers heat energy to the refrigerant, which in turn transfer that heat energy to the hot side coolant flow.

7 Claims, 7 Drawing Sheets

(56) References Cited

U.S. PATENT DOCUMENTS 5,749,235 A 5/1998 Ueda
7,762,090 B2 * 7/2010 Lee ................................. 62/93
2005/0039878 A1 2/2005 Meyer et al.
2009/0260377 A1 10/2009 Miller et al.
2010/0281901 A1 * 11/2010 Kawase et al. .............. 62/238.7

* cited by examiner

PLATE-TYPE HEAT PUMP AIR CONDITIONER HEAT EXCHANGER FOR A UNITARY HEAT PUMP AIR CONDITIONER

TECHNICAL FIELD OF INVENTION

The present invention relates to a heating and air-conditioning system for an automotive vehicle; particularly, to a heat pump air-conditioning system; and more particularly, to a heat exchanger for a heat pump air-conditioning system.

BACKGROUND OF INVENTION

For the comfort of the occupants in the passenger compartment, motor vehicles typically include dedicated air-conditioning systems and heating systems. The heating system includes a heater core located inside a heating, ventilating, and air conditioning (HVAC) module of the vehicle. The heater core is typically a liquid-to-air heat exchanger that supplies thermal energy to the passenger compartment for comfort heating. A heat transfer liquid, such as a glycol based coolant, conveys waste heat from an internal combustion engine to the heater core where the thermal energy from the heat transfer liquid is transferred to the ambient air flowing through the heater core to the passenger compartment. With the advent of greater efficiency internal combustion engines, hybrid vehicles having smaller internal combustion engines, and especially electrically driven vehicles, the amount of thermal energy available to provide comfort to occupants in the passenger compartment may not be adequate.

To provide supplemental heat to the passenger compartment for vehicles having smaller internal combustion engines, it is known to operate the air-conditioning system in heat pump mode. A typical motor vehicle air-conditioning system includes an evaporator located in the HVAC module and a condenser located in the front engine compartment exposed to outside ambient air. A compressor circulates a two-phase refrigerant through the evaporator where it changes into a low pressure vapor phase by absorbing heat from the passenger compartment. After the low pressure vapor is compressed to a high pressure vapor by the compressor, the vapor phase refrigerant is transferred to the condenser where the high pressure vapor is condensed into a high pressure liquid phase by releasing the heat to the ambient air. The liquid phase is returned to the evaporator through an expansion valve which converts high pressure liquid refrigerant to a low pressure mixture of liquid and vapor refrigerant to continue the cycle. By operating the air-conditioning system in heat pump mode, the refrigerant flow is reversed, in which case the condenser absorbs heat from the outside ambient air by evaporating the liquid phase refrigerant and the evaporator releases the heat to the passenger compartment by condensing the vapor phase refrigerant. One disadvantage to operating the air-conditioning system in heat pump mode, since the low pressure side of the system when used in air conditioning mode would become the high pressure side when used in heat pump mode, is the increase in system complexity due to the requirement of having to reinforce the refrigerant plumbing throughout the system by using thicker gage tubing and fittings. There is also the need to reinforce the evaporator to withstand the high pressure refrigerant, and to install an additional expansion valve and receiver together with additional associated plumbing. Another known disadvantage of operating the system in heat pump mode is that in cooler climates, as the surface temperature of the condenser drop below 32° F., any moisture condensed on the surface of the condenser is subject to freezing, therefore potentially reduces the system's efficiency or even damage the condenser.

Electric heaters are known to be used to provide supplemental heat to the passenger compartment for vehicles using the air-conditioning system as a heat pump. In the coldest of climates, it is known that operating the air-conditioning system in heat pump mode is ineffective; therefore, additional electric heaters are required. However, for hybrid and electrical vehicles, electrical heaters represent an increased current draw that significantly reduces the electric drive range.

Based on the foregoing, there is need for a heating system that provides supplementary heat to the passenger compartment of a motor vehicle that does not require reversing the refrigerant cycle of the air-conditioning system or detrimentally impact the electric driving range.

SUMMARY OF THE INVENTION

The present invention relates to Unitary Heat Pump Air Conditioner (Unitary HPAC) for a Unitary HPAC System. The Unitary HPAC includes a plate-type HPAC heat exchanger having a plurality of plates with predefined openings, a plurality of flow spaces adjacent the openings, and bosses about selected openings. The plates are arranged, stacked, and hermetically sealed between an upstream end plate and a downstream end plate defining a first heat exchanger portion, a second heat exchanger portion, and an internal heat exchanger sandwiched therebetween.

The first heat exchanger portion is configured to receive a refrigerant flow and a hot side coolant flow having a lower temperature than the refrigerant flow. The refrigerant flow is in non-contact thermal communication with the hot side coolant flow, whereby heat energy is transferred from the refrigerant flow to the hot side coolant flow.

The second heat exchanger portion is configured to receive the refrigerant flow exiting from the first heat exchanger portion and a cold side coolant flow having a higher temperature than the refrigerant flow, wherein the cold side coolant flow is in non-contact thermal communication with the refrigerant flow, whereby heat energy is transferred from the cold side coolant flow to the refrigerant flow.

The internal heat exchanger portion is configured to receive the refrigerant flow exiting from the first portion heat exchanger before being received by the second heat exchanger portion and the refrigerant flow from the second heat exchanger portion. The temperature of the refrigerant flow exiting the first heat exchanger portion is higher than temperature of the refrigerant flow from the second heat exchanger portion. The refrigerant flow from the first heat exchanger portion is in non-contact thermal communication with the refrigerant flow from the second heat exchanger portion, whereby heat energy is transferred from the refrigerant flow exiting from the first heat exchanger portion to the lower temperature refrigerant flow from the second heat exchanger portion before exiting the second heat exchanger.

The Unitary HPAC also includes an electrically driven compressor having a high pressure discharge side hydraulically connected to the high pressure refrigerant inlet of first heat exchanger portion and a low pressure intake side hydraulically connected to the low pressure refrigerant outlet of second heat exchanger portion, and electrically driven hot side coolant and cold side coolant pumps in hydraulic communication with the hot side coolant inlet and cool side coolant inlet, respectively.

The plate-type HPAC heat exchanger together with the associated electrically driven compressor and coolant pumps may be mounted onto a platform or enclosing in a housing that is approximately the size of a bread box, thereby providing a compact Unitary HPAC for a Unitary HPAC System. Further features and advantages of the invention will appear more clearly on a reading of the following detailed description of an embodiment of the invention, which is given by way of non-limiting example only and with reference to the accompanying drawings.

BRIEF DESCRIPTION OF DRAWINGS

This invention will be further described with reference to the accompanying drawings in which.

DETAILED DESCRIPTION OF INVENTION

Referring to FIGS. 1 through FIG. 7 is a Unitary Heat Pump Air Conditioner System (Unitary HPAC System) and two embodiments of a Unitary HPAC for use in a motor vehicle. The motor vehicle may be that of one with an internal combustion engine, a hybrid vehicle having both an internal combustion engine and an electric drive, or that of an electric vehicle having an electric drive. The Unitary HPAC System is a compact hermetically sealed system that improves the overall efficiency of the heating system and also provides cooling system to the motor vehicle, which improves the driving ranges of both hybrid and electric vehicles by, for example, minimizing the use an electric current, such as that to power an electric heater. In essence, the Unitary HPAC system provides a dedicated refrigerant system in which the refrigerant cycle does not need to be reversed in order for the Unitary HPAC system to operate in heat pump mode. The Unitary HPAC system also provides a Unitary HPAC that is compact and easily installed in virtually any compartment of a vehicle that is about the size of a bread box or a small tool box. Further advantages of the Unitary HPAC System will be readily appreciated by the reading of the disclosure below.

Figure 1:
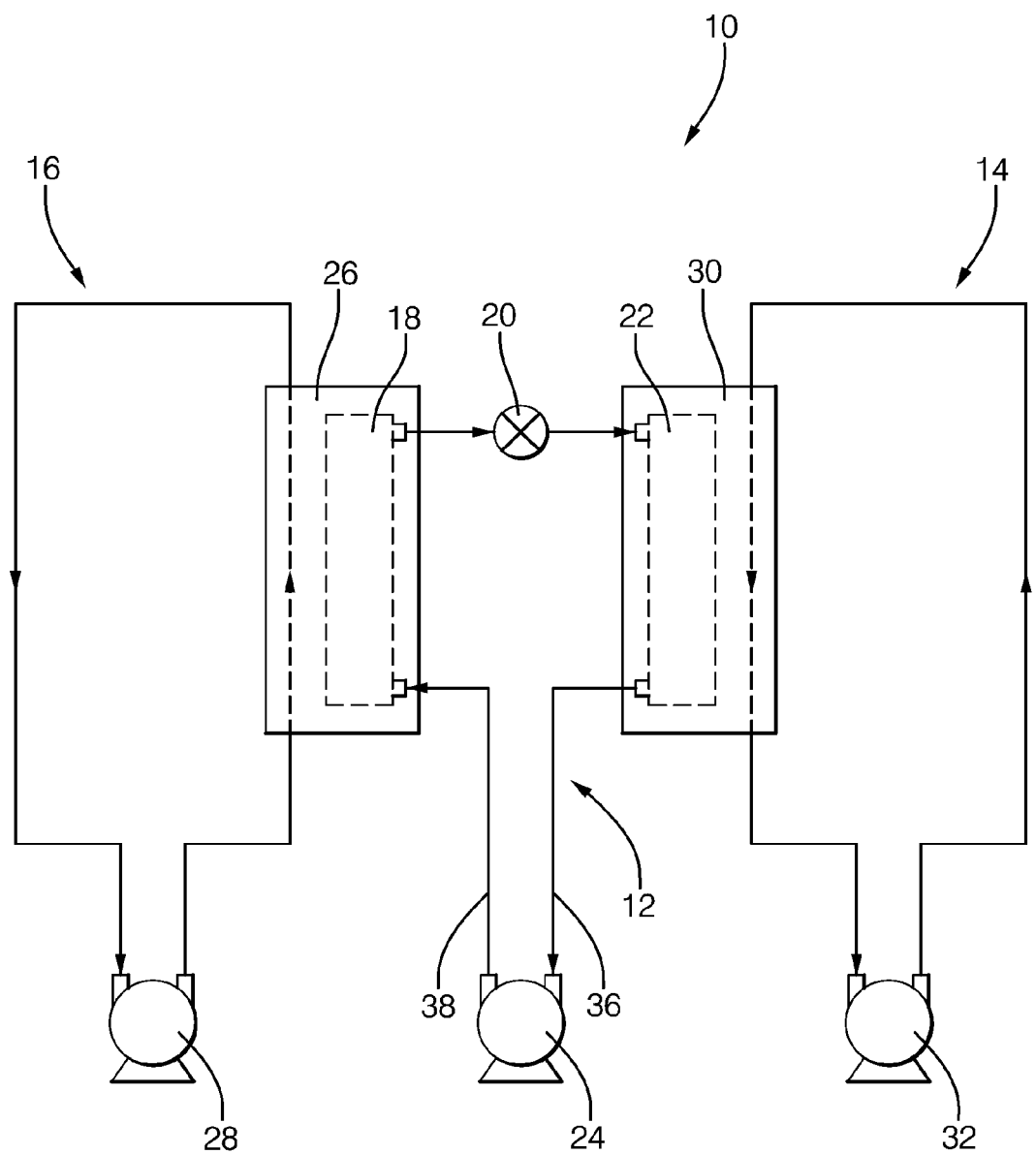
FIG. 1 a schematic flow diagram a Unitary Heat Pump Air Conditioner System (Unitary HPAC system) in accordance with the invention.

Shown in FIG. 1 is flow schematic of the Unitary HPAC System 10 having a refrigerant loop 12 in thermal communication with a cold coolant loop 14 and a hot coolant loop 16. The main components of the refrigerant loop 12 include a condenser 18, a refrigerant expansion device 20 such a thermal expansion valve (TXV) 20, and an evaporator 22 hydraulically connected in series. At the heart of the refrigerant loop is a refrigerant compressor 24 located downstream of the evaporator 22 and upstream of the condenser 18. The compressor 24 is responsible for compressing and transferring a two-phase refrigerant, such as R-134a or R-1234yf, throughout the refrigerant loop 12 of the Unitary HPAC System 10. The hot coolant loop 16 includes a hot side chiller 26 in thermal communication with the condenser 18 and a hot side coolant pump 28 that circulates a hot side coolant through the hot side chiller 26. Similarly, the cold coolant loop 14 includes a cold side chiller 30 in thermal communication with the evaporator 22 and a cold side coolant pump 32 that circulates a cold side coolant through the cold side chiller 30. The hot side chiller 26 and cold side chiller 30 may be that of a water jacket encasing the condenser 18 and evaporator 22, respectively, or may be part of a plate-type heat exchanger, which is disclosed in greater detail below. The cold coolant loop 14 may absorb waste heat energy from various heat sources throughout the vehicle, such as the waste heat from the internal combustion engine or electronics, thereby cooling the various heat sources. The refrigerant loop 12 transfers the heat energy from the cold coolant loop 14 to the hot coolant loop 16, which in turns transfer the heat energy to various heat sinks throughout the vehicle, such as an occupant heat exchanger to provide supplemental heat to the passenger compartment. The Unitary HPAC System 10 effectively captures waste heat energy and puts it to beneficial use within the vehicle.

The refrigerant cycle of the refrigerant loop 12 is typically the same as that of a dedicated air conditioning system of a motor vehicle operating in cooling mode. A two phase refrigerant is circulated through the refrigerant loop 12 by the compressor 24, which includes a suction side 36, also referred to as the low pressure side, and a discharge side 38, also referred to as the high pressure side. The suction side of the compressor receives a low pressure vapor phase refrigerant from the evaporator 22, after absorbing heat from the cold side coolant, and compresses it to a high pressure vapor phase refrigerant, which is then discharged to the condenser 18. As the high pressure vapor phase refrigerant is condensed to a high pressure liquid phase refrigerant in the condenser 18, heat is transferred to the hot side coolant flowing through the hot side chiller 26. Exiting the condenser 18, the high pressure liquid phase refrigerant may pass through a receiver (not shown) to separate any refrigerant vapor, a sub-cooler (not shown) to further cool the liquid phase refrigerant, and then to the TXV 20, through which the refrigerant begins to expand into a bubbling liquid phase. The bubbling liquid phase refrigerant enters the evaporator 22 and continues to expand into the low pressure vapor refrigerant, which is then cycled back to the suction side 36 of the compressor 24 to repeat the process.

Figure 2:
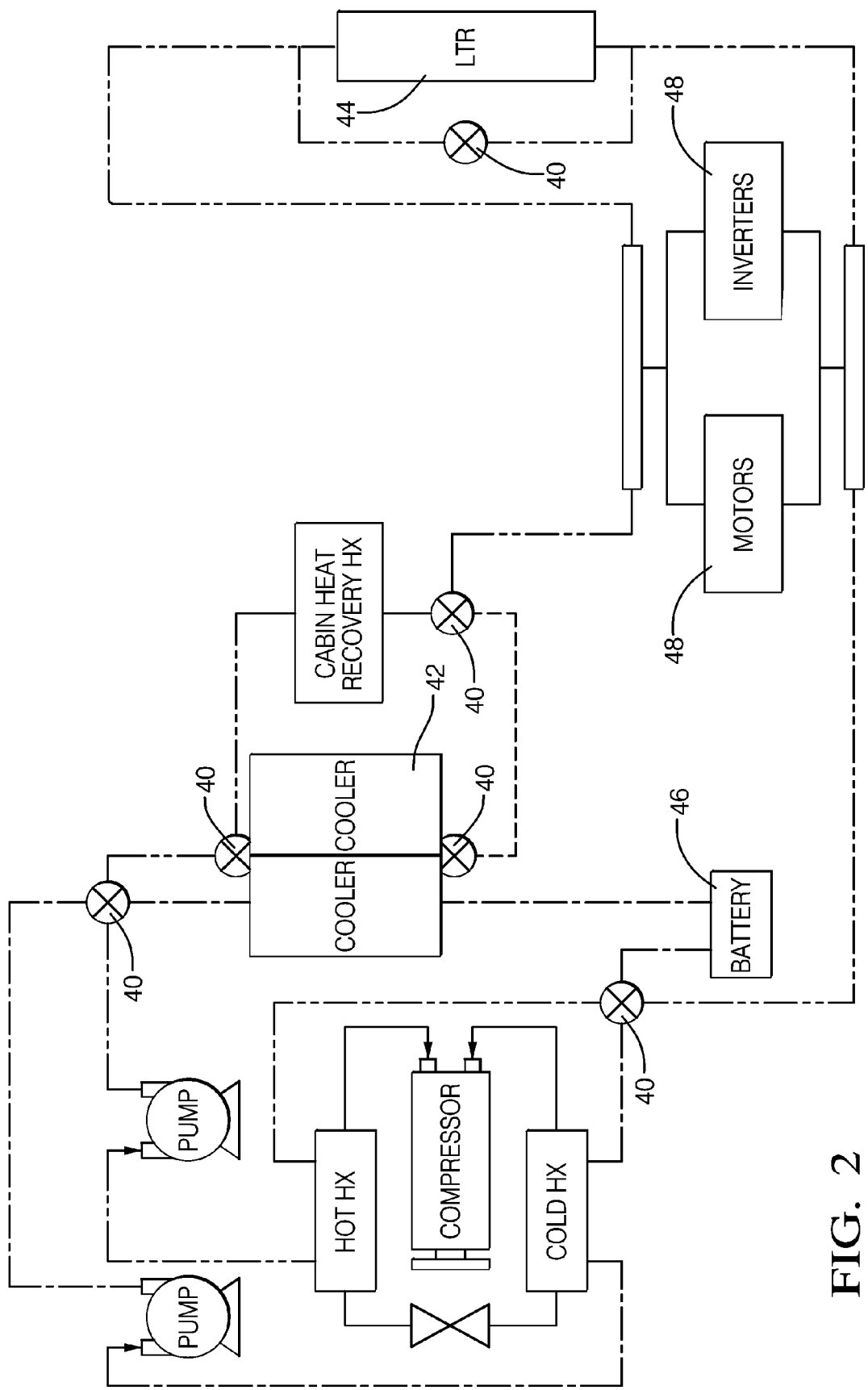
FIG. 2 shows an exemplary Unitary HPAC system operating in cooling mode.
Figure 3:
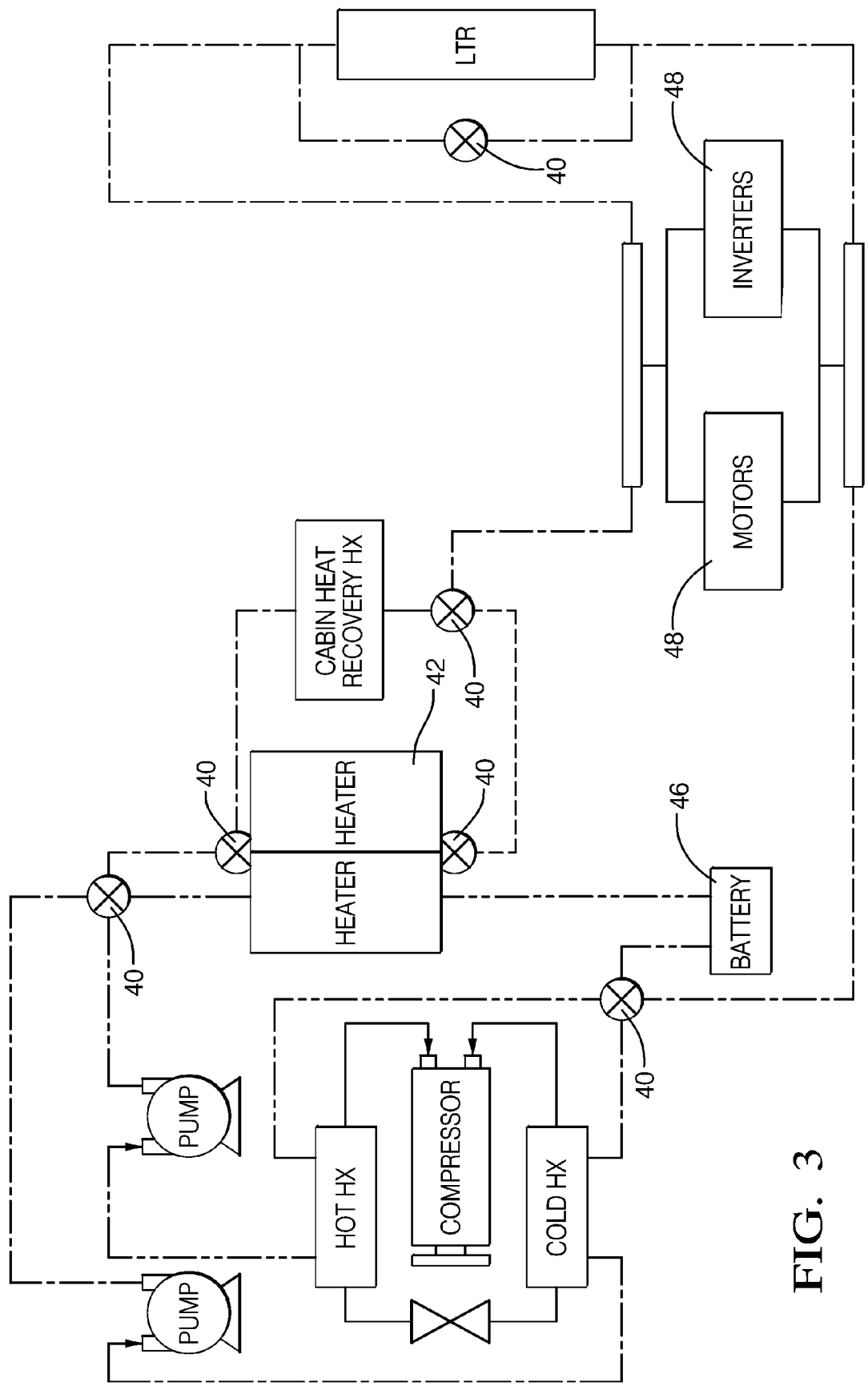
FIG. 3 shows an exemplary Unitary HPAC system operating in heating mode.

Referring to FIGS. 2 and 3, the flow paths of the hot and cold coolant loops throughout the vehicle may be reconfigured based on the cooling and heating needs of the vehicle. The hot and cold coolant loops may include a myriad of interconnecting branches with remotely activated valves 40 at strategic nodes that may be reconfigured to redefine the flow paths of the hot and cold loops to selectively provide hot or cold coolant flow to designated heat exchangers. For example, shown in FIG. 2 is the Unitary HPAC System 10 operating in cooling mode. The cold coolant loop (shown in single dashed lines) is configured to flow to a comfort heat exchanger 42 to cool the air to the occupant compartment and to a battery heat exchanger 46 to cool the batteries, while the hot coolant loop (shown in double dashed lines) is configured to dissipate the heat through an external heat exchanger 44. Shown in FIG. 3, in heat pump mode, the hot coolant loop (shown in double dashed lines) may be redirected to the comfort heat exchanger 42 to heat the air to the occupant compartment and to battery heat exchanger 46 to maintain the batteries at an optimal operating temperature, while the cold coolant loop (shown in single dashed lines) is directed to an ancillary heat exchangers 48 to scavenge waste heat from the vehicle's electronics or from the external ambient air. Unlike the known methods of operating an air-conditioning system in heat pump mode, the refrigerant loop 12 of the current invention is never reversed; therefore there is no need to reinforce the refrigerant tubing and fittings throughout the system since the low pressure side 38 of the refrigerant loop 12 is not subject to the high pressure refrigerant.

Figure 4:
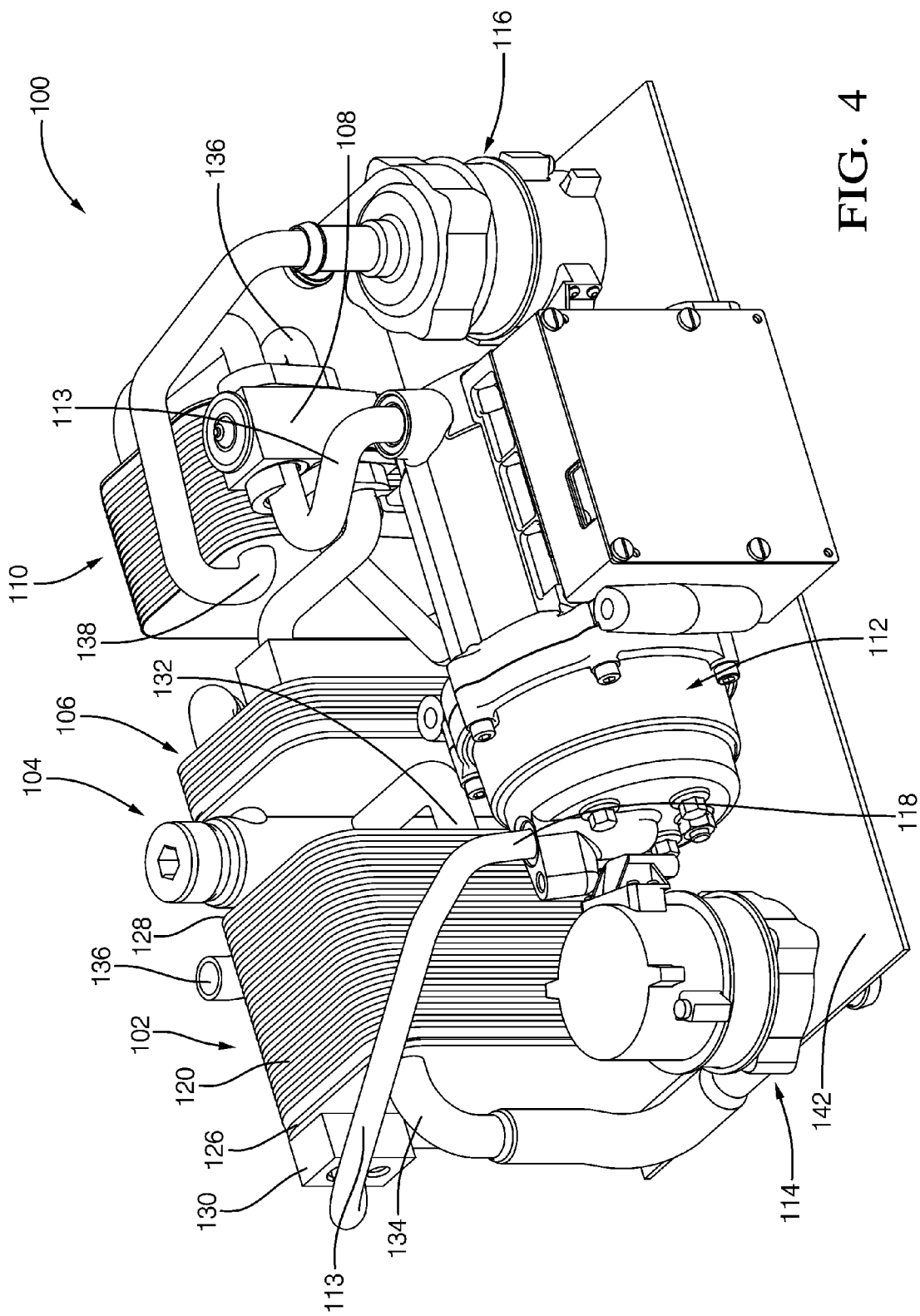
FIG. 4 shows an embodiment of the Unitary HPAC in accordance with the invention.

Shown in FIG. 4 is a compact Unitary HPAC 100 in accordance with an embodiment of the invention for the Unitary HPAC System 10 disclosed above. The Unitary HPAC 100 shown includes an integral condenser/hot side chiller assembly 102, a receiver 104, a sub-cooler 106, a thermal expansion valve (TXV) 108, and an integral evaporator/cold side chiller assembly 110. The Unitary HPAC 100 also includes an electrically driven compressor 112 for the circulation of a typical two-phase refrigerant through a series of refrigerant tubes 113 and electrically driven hot side and cold side coolant pumps 114, 116 configured to hydraulically connect to the hot coolant loop and cold coolant loop, respectively. The liquid coolant used in the hot and coolant loops is generally a mixture of 70% glycol-30% water, which prevents the coolant from freezing or becoming too viscous at the low temperatures needed in integral evaporator/cold side chiller assembly 110.

The integral condenser/hot side chiller assembly 110 is a plate-type heat exchanger assembly having a plurality of stamped metal plates 120 stacked and brazed between an upstream end plate 126 and a downstream end plate 128. The stamped metal plates include features known to those of ordinary skill in the art, such as openings, bosses about selected openings, and flanges, which when stacked, define a refrigerant passageway for high pressure refrigerant flow and a separate hot coolant passageway for hot coolant flow. The plates may include numerous contact points established between adjacent plates to induce turbulence to the fluids flowing therethrough to provide a high heat transfer coefficient.

The flows of the hot refrigerant and hot coolant through the integral condenser/hot side chiller assembly 102 are non-contact; in other words, the two fluids are not intermingle, but are in thermal communication with each other, and may be concurrent or countercurrent flow. Heat energy from the higher temperature refrigerant is transferred to the lower temperature hot coolant, thereby increasing the temperature of the hot coolant as it leaves the integral condenser/hot side chiller assembly 102 and returning to the hot coolant loop (not-shown). The upstream end plate 126 includes a refrigerant inlet 130 in fluid communication with the discharge side 118 of the electrically driven compressor 112 and a hot coolant inlet 134 in fluid communication with the hot side coolant pump 116. The downstream end plate 128 includes a refrigerant outlet 132 in fluid communication with the receiver 104 and a hot coolant outlet 136 configured to hydraulically connect to the hot coolant loop. Similarly, the downstream sub-cooler assembly 106 and integral evaporator/cold side chiller assembly 110 may also be plate-type heat exchangers. The integral evaporator/cold side chiller assembly 110 includes a cold coolant inlet 138 and outlet 140, in which the cold coolant outlet 140 is adapted to hydraulically connect to the cold coolant loop (not shown).

Unlike a traditional air conditioning system, where the refrigerant side components are remotely dispersed throughout the engine bay and within the HVAC module, the refrigeration components of the Unitary HPAC 100 including the integral condenser/hot side chiller assembly 102, receiver 104, sub-cooler assembly 106, TXV 108, integral evaporator/cold side chiller assembly 110, and electrically driving compressor 112 and coolant pumps 114, 116 may be all mounted onto a single platform 142 measuring 376 mm by 220 mm or less. The components may even be enclosed a housing, having a similar sized base and a height of less than 212 mm, which is approximately the size of a typical bread box, for ease of handling and protection against the environment. The centralized location of the components that form the Unitary HPAC 100 allows the use of shorter length refrigerant tubes 113 which are manufactured from a refrigerant impermeable material, such as stainless steel, aluminum, and/or copper. The shortened length refrigerant impermeable tubes 113 minimize refrigerant leaks and moisture infiltration; thereby allowing the use of a smaller receiver 104, since a large volume of refrigerant reserve is not required. The reduction of moisture infiltration reduces or eliminates the volume of desiccant needed, thereby resulting in a more compact Unitary HPAC 100. Due to its compact size, the Unitary HPAC 100 may be installed in virtually any location within a motor vehicle that can fit a bread box, such as within the trunk, under the hood, within the dashboard, or even under the seats.

Figure 5:
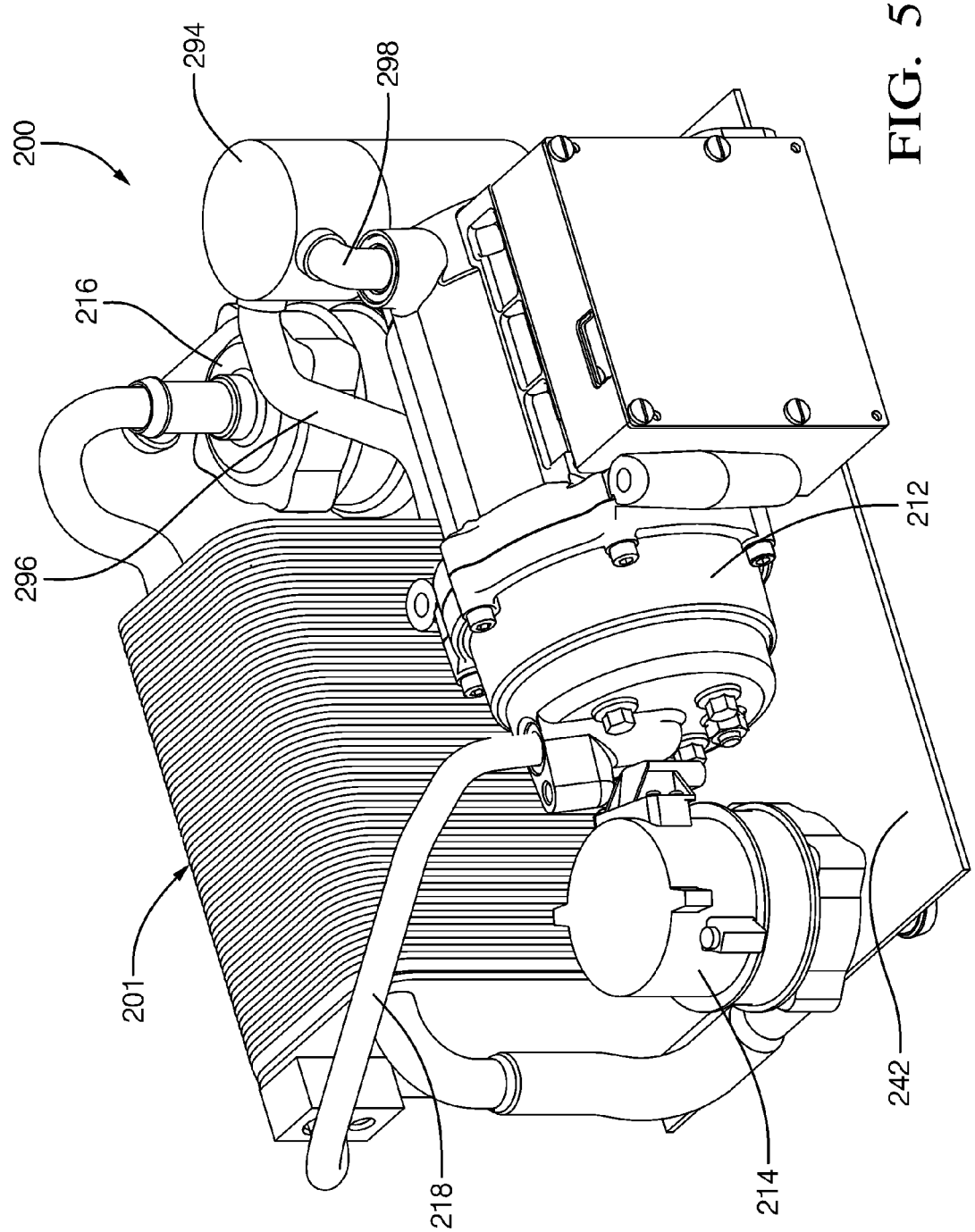
FIG. 5 shows another embodiment of the Unitary HPAC in accordance with the invention having a Plate-type HPAC Heat Exchanger, electrically driven compressor, and electrically driven coolant pumps.
Figure 6:
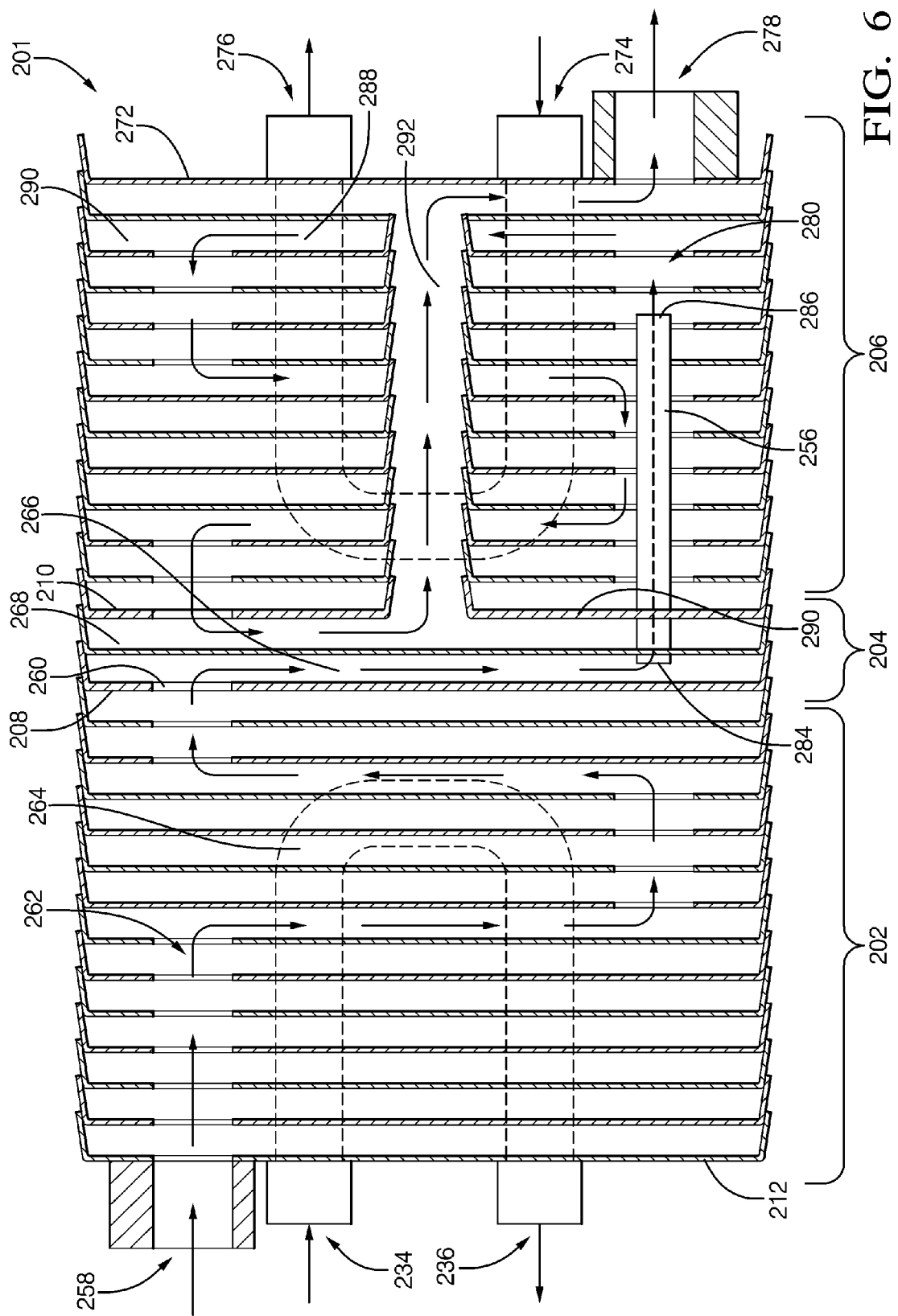
FIG. 6 is a schematic cross-section of the Plate-type HPAC Heat Exchanger of FIG. 5, showing the flow path of the hot and cold coolants, and flow path of refrigerant.
Figure 7:
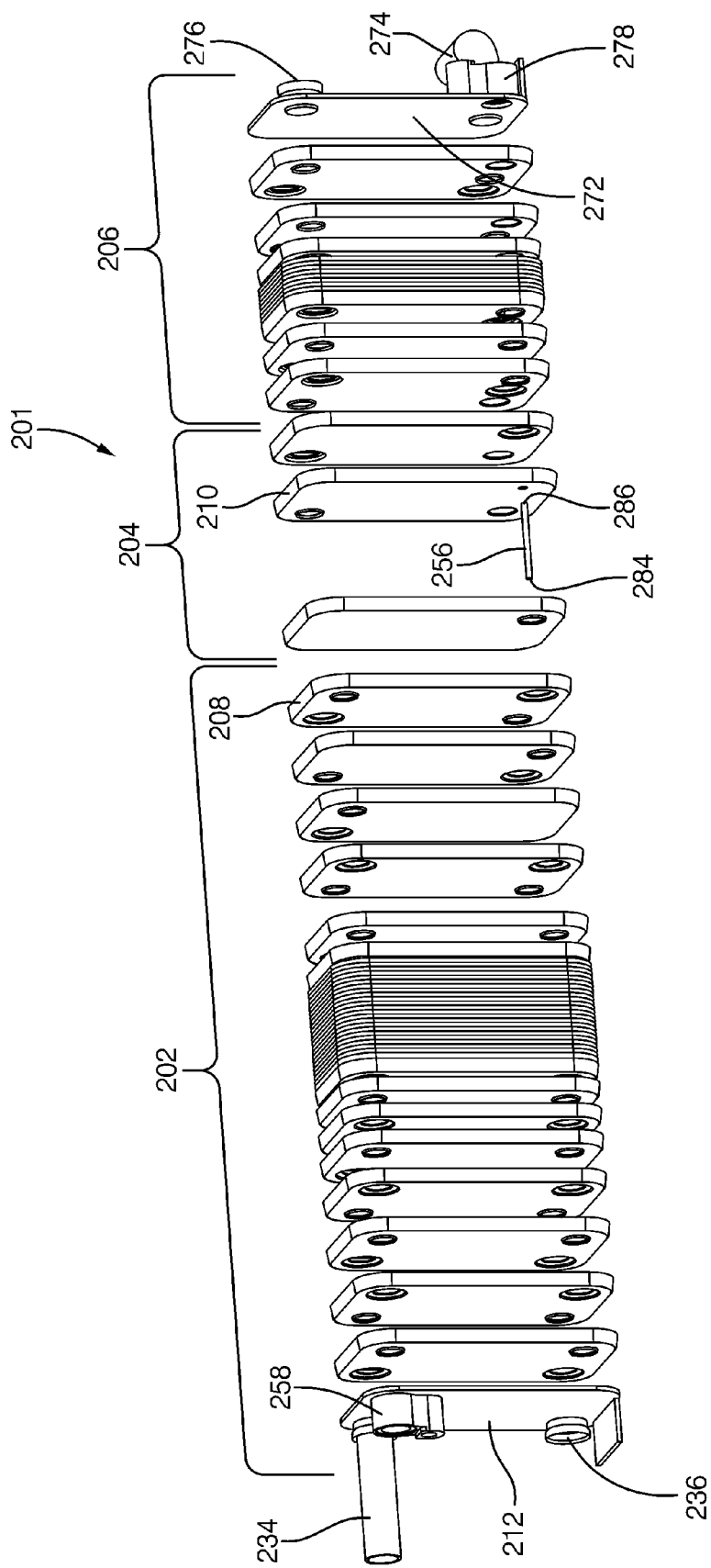
FIG. 7 shows and exploded view of the embodiment of the Plate-type HPAC Heat Exchanger of FIG. 5.

Shown in FIGS. 5 through 7 is an alternative embodiment of the Unitary HPAC 200, in which the integral condenser/hot side chiller assembly 102, the receiver 104, the sub-cooler 106, the thermal expansion valve (TXV) 108, and the integral evaporator/cold side chiller assembly of the Unitary HPAC 100 shown in FIG. 4 is replaced by a single compact plate-type HPAC heat exchanger 201 assembled from a plurality of stacked and brazed metallic plates. An accumulator 294 may be provided downstream, with respect to the flow of refrigerant, of the plate-type HPAC heat exchanger 201 and upstream of the compressor 212. The plate-type HPAC heat exchanger 201 includes essentially three joined heat exchanger portions working in conjunction as one integral unit, in which a refrigerant is used to transfer heat energy from a cold coolant loop to a hot coolant loop, thereby cooling the cold coolant loop and heating the hot coolant loop.

Best shown in FIGS. 6 and 7, the plate-type HPAC heat exchanger 201 includes a condenser/hot side chiller portion 202 and an evaporator/cold side chiller 206 portion, with an internal heat exchanger (IHX) portion 204 sandwiched therebetween. The IHX portion 204, together with an integrated refrigerant expansion device 256 located within the evaporator/cold side chiller portion 206 provides an even more compact Unitary HPAC. The plate-type HPAC heat exchanger 201 together with the associated electrically driven compressor 212 and coolant pumps 214, 216 may be mounted onto a platform 242 or enclosing in a housing measuring 376 mm by 220 mm by 175 mm or smaller.

Referring to FIGS. 6 and 7, the condenser/hot side chiller portion 202 is essentially a plate-type heat exchanger formed of a plurality of stamped metal plates stacked between an upstream end plate 270 and first boundary plate 208. The upstream end plate 270 includes a high pressure refrigerant inlet 258 in fluid communication with the high pressure discharge side 218 of the electrically driven compressor 212. The first boundary plate 208 includes a high pressure vapor refrigerant IHX port 260 for refrigerant discharge to the IHX portion 204. However, unlike the first embodiment, the upstream end plate 270 includes both a hot coolant inlet 234 and a hot coolant outlet 236. The stamped metal plates include portions in which are formed first and second flow spaces, which when stacked and brazed defines a high pressure refrigerant passageway 262 for refrigerant flow from high pressure inlet 258 to the high pressure refrigerant IHX port 260, and a separate hot coolant passageway 264 for hot coolant flow from the hot coolant inlet 234 to the hot coolant outlet 236. The high pressure refrigerant passageway 262 and the hot coolant passageway 264 are non-contact, but in thermal communication, in which heat energy from the higher temperature high pressure refrigerant is transferred to the lower temperature hot coolant. The hot coolant inlet 234 and hot coolant outlet 236 are configured to hydraulically connect to a hot coolant loop.

The IHX portion 204 is also a plate-type heat exchanger assembled from a plurality of stamped metal plates stacked between the first and a second boundary plates 208, 210, which joins the IHX portion 204 to the condenser/hot side chiller and evaporator/cold side chiller portions 202, 206, respectively. The stacked metal plates include portions, in which are formed first and second flow spaces, which when stacked and brazed defines an IHX high pressure refrigerant channel 266 and an IHX low pressure refrigerant channel 268. The second boundary plate 210 defines a low pressure refrigerant port 291, in hydraulic communication with the IHX low pressure refrigerant channel 268. The flow of and effects of the non-contact high and low pressure refrigerants flowing through the IHX high pressure refrigerant channel 266 and IHX low pressure refrigerant channel 268 will be discussed in detail below.

The evaporator/cold side chiller portion 206 is also essentially a plate-type heat exchanger formed of a plurality of stamped metal plates stacked and assembled between the second boundary 210 and a downstream end plate 272. The downstream end plate 272 includes a cold coolant inlet 274, a cold coolant outlet 276, and a low pressure refrigerant outlet 278. The stacked metal plates include portions having a plurality of openings and bosses surrounding selected openings to define a cold coolant passageway 288 that is in hydraulic communication between the cool coolant inlet 276 and outlet 278, a refrigerant expansion chamber 280 extending in a direction toward the downstream end plate 272, and a low pressure refrigerant passageway 290 hydraulically connecting the refrigerant expansion chamber 280 adjacent to the downstream end plate 272 back toward the IHX low pressure port 291. A tubular expansion device 256 having an inlet end 284 and an outlet end 286 is disposed in the refrigerant expansion chamber 280. The tubular expansion device inlet 284 is in fluid communication with the IHX high pressure refrigerant channel 266 and the expansion device outlet 286 terminates within the refrigerant expansion chamber 280 in the direction of the downstream end plate 272.

Shown in FIG. 6 is schematic of a cross-section of the plate-type HPAC Heat Exchanger 201 showing the paths of the hot coolant passageway 264 through the condenser/hot side chiller portion 202 and cold coolant passageway 288 through the evaporator/cold side chiller portion 206. Also shown in FIG. 6 is the flow path of refrigerant as it travels through each of the condenser/hot side chiller portion 202, IHX portion 204, and evaporator/cold side chiller 206 portion. For clarity of illustration, the path of the coolant passageways are simplified as a U-path, but in actuality, the paths of the coolants may be concurrent or counter-current of that of the refrigerant passageways defined within each respective portion. What is important is that the flow of coolant and refrigerant do not co-mingle and that there is thermal communication for heat transfer between the respective fluids flowing within each of the three portions 202, 204, 206.

Referring to condenser/hot side chiller portion 202 shown in FIG. 6, the high pressure refrigerant enters the high pressure refrigerant inlet 258 of the condenser/hot side chiller portion 202 and travels through the high pressure refrigerant passageway 264 to the IHX high pressure port 260 of the IHX portion 204. The lower temperature hot coolant enters the hot coolant inlet 234, travels through the hot coolant passageway 264, and exits through the hot coolant outlet 236. As the high pressure refrigerant and hot coolant travels through their respective passageways, heat energy is transferred from the higher temperature high pressure refrigerant to the lower temperature hot coolant, thereby condensing the high pressure vapor refrigerant to a high pressure liquid refrigerant.

Referring to IHX portion 204 shown in FIG. 6, the high pressure liquid refrigerant enters the IHX high pressure port 260, travels through the IHX high pressure refrigerant channel 266 to the expansion device inlet 284. Low pressure refrigerant enters a IHX low pressure port 260 provided on the second boundary plate 210, flows through the IHX low pressure channel 268, and exits the plate-type HPAC heat exchanger via the low pressure refrigerant exit header 292, which extends through the evaporator/cold side chiller portion 206 and in hydraulic communication with the low pressure refrigerant outlet 278. The high pressure refrigerant flowing through the IHX high pressure channel 266 and the low pressure refrigerant flowing through the IHX low pressure channel 268 are non-contact, in other words, are not intermingled, but are in thermal communication. A portion of the remaining heat energy from the high pressure refrigerant after leaving the condenser/hot side chiller portion 202 is transferred to the lower temperature low pressure refrigerant from the evaporator/cold side chiller portion 206. The IHX portion 204 increases the amount of sub-cooling of the high pressure liquid refrigerant prior to the expansion device 256 which increases the performance of evaporator/cold side chiller assembly 206. The heat energy transferred to the low pressure vapor refrigerant exiting the evaporator/cold side chiller portion 206 increases the amount of superheat to the compressor 212, thereby reducing the likelihood of liquid entering the compressor 212. Additionally, the high side pressure is lower resulting in lower stress on high side refrigerant components, thereby allowing the use of lower gage refrigerant tubing and fittings on both the low and high pressure side. Furthermore, the IHX portion 204 provides additional capacity for the storage of excess refrigerant, thereby eliminating the need for an external receiver, which further reduces the footprint of the Unitary HPAC.

Referring to the evaporator/cold side chiller portion 206 shown in FIG. 6, the high pressure liquid refrigerant exiting the IHX portion 204 enters the inlet 284 of the expansion device 256 which conveys the refrigerant into the expansion chamber 280 of the evaporator/cold side chiller portion 206. The high pressure liquid refrigerant begins to expand into a bubbling liquid as it exits the expansion device outlet 286 into the expansion chamber 280 toward the downstream plate. The refrigerant then flows through the low pressure refrigerant passageway 290 back toward the second boundary plate 210 and continues to expand into a vapor phase as it absorb the heat energy form the cold coolant flowing through the cold coolant passageway 288. The low pressure vapor refrigerant then enters the IHX low pressure inlet 291 as described above before exiting the evaporator/cold side chiller portion 206 by way of the refrigerant exit header 292.

In other words, the spent lower temperature low pressure vapor refrigerant from the evaporator/cold side chiller portion 206 is used to pre-cool the relatively higher temperature high pressure liquid refrigerant exiting the condenser/hot side chiller portion 202 in the IHX portion 204 prior to the internal expansion device 256.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the intentions without departing from the essential scope thereof. Therefore, it is intended that the invention not be limited to the particular embodiment disclosed as the best mode contemplated for carrying out this invention, but that the invention will include all embodiments falling within the scope of the appended claims.

Having described the invention, it is claimed:

1. A unitary heat pump air conditioner (Unitary HPAC), comprising:
    a plate-type HPAC heat exchanger having a plurality of plates stacked and hermetically sealed between an upstream end plate and a downstream end plate, defining:
    a first heat exchanger portion configured to receive a refrigerant flow and having a hot side coolant passageway for a hot side coolant flow having a lower temperature than the refrigerant flow, wherein said refrigerant flow is in non-contact thermal communication with the hot side coolant flow, whereby heat energy is transferred from the refrigerant flow to the hot side coolant flow; and
    a second heat exchanger portion is configured to receive a refrigerant flow exiting from said first heat exchanger portion and having a cold side coolant passageway for a cold side coolant flow having a higher temperature than the refrigerant flow exiting from said first heat exchanger portion, wherein the cold side coolant flow is in non-contact thermal communication with the refrigerant flow, whereby heat energy is transferred from the cold side coolant flow to the refrigerant flow;
    wherein said first and second heat exchanger portions define a single unitary structure having a continuous torturous refrigerant passageway in thermal contact with both the cold side coolant flow and the hot side coolant flow.

2. The Unitary HPAC of claim 1, wherein said plate-type HPAC heat exchanger further includes:
    an internal heat exchanger portion configured to receive the refrigerant flow exiting from said first heat exchanger portion before being received by said second heat exchanger portion and a refrigerant flow from said second heat exchanger portion before exiting said second heat exchanger portion,
    wherein the temperature of the refrigerant flow exiting said first heat exchanger portion is higher than temperature of the refrigerant flow exiting from said second heat exchanger portion, and
    wherein the refrigerant flow from said first heat exchanger portion is in non-contact thermal communication with the refrigerant flow from the second heat exchanger portion, whereby heat energy is transferred from the refrigerant flow exiting from said first heat exchanger portion to the lower temperature refrigerant flow from said second heat exchanger portion.

3. The Unitary HPAC of claim 2, wherein said internal heat exchanger portion is sandwiched between said first heat exchanger portion and said second heat exchanger portion, thereby forming a single unit integral plate-type HPAC heat exchanger.

4. The Unitary HPAC of claim 1, wherein said first heat exchanger portion comprises:
    a hot side coolant inlet, a hot side coolant outlet, and a high pressure refrigerant inlet disposed on said upstream end plate,
    a hot side coolant passageway in fluid communication with said hot side coolant inlet and hot side coolant outlet;
    a first boundary plate spaced from said upstream end plate defining a high pressure refrigerant port; and
    a high pressure refrigerant passageway in fluid communication with said refrigerant inlet of said upstream plate and said high pressure refrigerant port of first boundary plate;
    wherein said hot side coolant passageway and said high pressure refrigerant passageway are in non-contact thermal communication.

5. The Unitary HPAC of claim 4, wherein said second heat exchanger portion comprises:
    a cold side coolant inlet, a cold side coolant outlet, and a low pressure refrigerant outlet disposed on said downstream end plate,
    a cold side coolant passageway in fluid communication with said cold side coolant inlet and cold side coolant outlet;
    an elongated refrigerant expansion chamber extending in a direction toward said downstream end plate; and
    a low pressure refrigerant passageway in fluid communication with said refrigerant expansion chamber and said low pressure refrigerant outlet;
    wherein said cold side coolant passageway and said low pressure refrigerant passageway are in non-contact thermal communication.

6. A plate-type HPAC heat exchanger comprising:
    a first heat exchanger portion having an upstream end plate including a high pressure refrigerant inlet;
    a second heat exchanger portion having a downstream end plate including a low pressure refrigerant outlet;
    an internal heat exchanger having a first boundary plate and a second boundary plate, wherein said internal heat exchanger is integrally sandwiched between said first heat exchanger portion and said second heat exchanger portion;
    a refrigerant passageway extending from said high pressure refrigerant inlet to said low pressure refrigerant outlet, defining a high pressure refrigerant flow passageway through said first heat exchanger portion and a low pressure refrigerant flow passageway through said second heat exchanger portion;
    a hot side coolant passageway extending through the first heat exchanger portion in non-contact thermal communication with said high pressure refrigerant passageway; and
    a cold side coolant passageway extending through the second heat exchanger portion in non-contact thermal communication with said low pressure refrigerant passageway.

7. The plate-type HPAC heat exchanger of claim 6, wherein said internal heat exchanger includes a high pressure refrigerant channel in hydraulic communication with said high pressure refrigerant passageway of first heat exchanger portion, and a low pressure refrigerant channel in hydraulic communication with said low pressure refrigerant outlet of second heat exchanger portion.

* * * * *